(12) United States Patent
Takahashi et al.

(10) Patent No.: US 11,794,449 B2
(45) Date of Patent: *Oct. 24, 2023

(54) SURFACE-TREATED STEEL SHEET AND METHOD FOR MANUFACTURING SURFACE-TREATED STEEL SHEET

(71) Applicant: NIPPON STEEL CORPORATION, Tokyo (JP)

(72) Inventors: Takehiro Takahashi, Tokyo (JP); Mamoru Saito, Tokyo (JP); Kiyokazu Ishizuka, Tokyo (JP); Yasuto Goto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 547 days.

This patent is subject to a terminal disclaimer.

(21) Appl. No.: 17/253,322

(22) PCT Filed: Jul. 5, 2019

(86) PCT No.: PCT/JP2019/026779
§ 371 (c)(1),
(2) Date: Dec. 17, 2020

(87) PCT Pub. No.: WO2020/009212
PCT Pub. Date: Jan. 9, 2020

(65) Prior Publication Data
US 2021/0269929 A1 Sep. 2, 2021

(30) Foreign Application Priority Data
Jul. 6, 2018 (JP) .................... 2018-128847

(51) Int. Cl.
*B32B 15/01* (2006.01)
*C25D 3/12* (2006.01)
(Continued)

(52) U.S. Cl.
CPC ............ *B32B 15/013* (2013.01); *C21D 8/005* (2013.01); *C21D 8/0236* (2013.01); *C22C 38/02* (2013.01);
(Continued)

(58) Field of Classification Search
None
See application file for complete search history.

(56) References Cited

U.S. PATENT DOCUMENTS

2009/0025838 A1 1/2009 Mineji et al.
2012/0171518 A1 7/2012 Takematsu et al.
(Continued)

FOREIGN PATENT DOCUMENTS

CN 101400817 A 4/2009
CN 102458701 A 5/2012
(Continued)

OTHER PUBLICATIONS

"Steels-Micrographic determination of the apparent grain size", JIS G 0551, 2013, total 6 pages.
(Continued)

*Primary Examiner* — Wojciech Haske
(74) *Attorney, Agent, or Firm* — Birch, Stewart, Kolasch & Birch, LLP

(57) ABSTRACT

A surface-treated steel sheet of the present invention includes a base steel sheet and a Ni—Co—Fe alloy-plated layer on at least one surface of the base steel sheet, in which, in the alloy-plated layer, a Ni coating weight is 7.1 to 32.5 g/m², a Co coating weight is 0.65 to 5.2 g/m², and a total of the Ni coating weight and the Co coating weight is in a range of 9.0 to 35.0 g/m². In an outermost layer of the alloy-plated layer, a Co concentration is in a range of 20 to 60 atom %, and a Fe concentration is in a range of 5 to 30 atom %. In the alloy-plated layer, a region having a thickness of 2 μm
(Continued)

or more, in which a total of a Ni concentration and the Co concentration is 10 atom % or more and the Fe concentration is 5 atom % or more, is present, and the base steel sheet has a predetermined chemical composition, and a ferrite grain size number is 9.0 or more.

11 Claims, 2 Drawing Sheets

(51) Int. Cl.
| | |
|---|---|
| C25D 5/12 | (2006.01) |
| C21D 8/00 | (2006.01) |
| C21D 8/02 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C25D 3/20 | (2006.01) |
| H01M 50/10 | (2021.01) |

(52) U.S. Cl.
CPC .............. *C22C 38/04* (2013.01); *C22C 38/06* (2013.01); *C22C 38/12* (2013.01); *C22C 38/14* (2013.01); *C25D 3/12* (2013.01); *C25D 3/20* (2013.01); *C25D 5/12* (2013.01); *H01M 50/10* (2021.01); *C21D 2211/005* (2013.01)

(56) References Cited

U.S. PATENT DOCUMENTS

2014/0050971 A1   2/2014   Tomomori et al.
2018/0019446 A1*  1/2018   Kuniya ................. H01M 10/24

FOREIGN PATENT DOCUMENTS

| EP | 3 279 966 A1 | 2/2018 |
| JP | 2014-47359 A | 3/2014 |
| JP | 2016-186950 A | 10/2016 |
| WO | WO2012/147843 A1 | 11/2012 |
| WO | WO2016/158004 A1 | 10/2016 |

OTHER PUBLICATIONS

Sakai et al., The journal of the Iron and Steel Institute of Japan, Tetsu to hagane, Sep. 5, 1985, vol. 71, No. 13, S1276.
Serebrennikova, "Can-Cathode Interface in Alkaline Zn/Mno$_2$ Batteries: Optimization of Can Plating Composition", Journal of The Electrochemical Society, 2007, vol. 154, No. 9, pp. C487-C493.

* cited by examiner

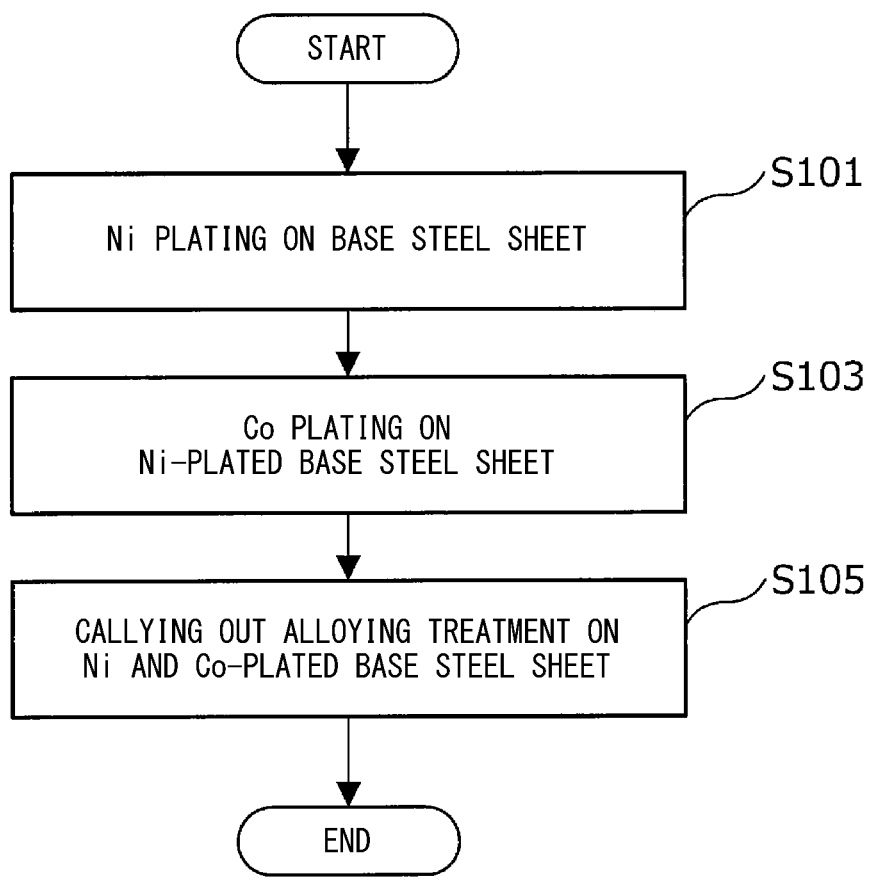

SURFACE-TREATED STEEL SHEET AND METHOD FOR MANUFACTURING SURFACE-TREATED STEEL SHEET

TECHNICAL FIELD OF THE INVENTION

The present invention relates to a surface-treated steel sheet and a method for manufacturing a surface-treated steel sheet.

The present application claims priority based on Japanese Patent Application No. 2018-128847 filed in Japan on Jul. 6, 2018, the content of which is incorporated herein by reference.

RELATED ART

In the related art, Ni-plated steel sheets have been used as surface-treated steel sheets for battery containers. Due to the excellent chemical stability of Ni, Ni-plated steel sheets are used for a variety of battery containers such as battery cans and the like for alkaline manganese dry batteries, lithium ion batteries, and nickel-hydrogen batteries. At the time of manufacturing a Ni-plated steel sheet, which is the above-described surface-treated steel sheet for a battery container, a method of continuously plating a steel strip that is yet to be made into a can is advantageous in terms of the manufacturing costs and plating uniformity. Therefore, it is becoming more common to carry out deep-draw pressing on a Ni-plated steel sheet, fill the Ni-plated steel sheet with a positive electrode substance, a negative electrode substance, an electrolytic solution, and the like, and use the Ni-plated steel sheet as a positive electrode can or the like that is a container also serving as a positive electrode terminal for itself.

In a case where a Ni-plated steel sheet is used as, for example, a positive electrode can of an ordinary alkaline battery, in order to enhance the discharge characteristics, a conductive coating containing graphite is applied to the inner surface of the positive electrode can to maintain the contact with a positive electrode mixture. However, in the case of using an organic solvent-based coating, there is a problem of environmental contamination, and, in the case of using a water-based coating, the consumption of energy for drying becomes a problem. In addition, in the case of using a Ni-plated steel sheet as a positive electrode can, it is known that Ni oxidizes over time, and the contact resistance increases to degrade the discharge characteristics, and additionally, there is a case where the use of the Ni-plated steel sheet is not always satisfactory in terms of the alkali resistance (liquid leakage resistance).

It is known that the above-described problems of the Ni-plated steel sheet are solved or improved by using a surface-treated steel sheet further coated with a Co-plated layer on the Ni-plated layer as the inner surface of the positive electrode can for an alkaline battery (for example, refer to Non-Patent Document 1).

Based on such a finding, for example, Patent Document 1 below points out that, in the case of using a plated steel sheet for which only Co plating is carried out on a Ni-plated layer as a container of a battery in which a strong alkaline electrolytic solution is used, Co is eluted over time, which makes it difficult to maintain the battery characteristics, and describes that it is appropriate to use a Ni—Co alloy layer in the outermost layer portion of the plated layer and to control the Co/Ni value in the surface of the Ni—Co alloy layer, which is obtained by Auger electron spectroscopic analysis, in a range of 0.1 to 1.5. Similarly, Patent Document 2 below describes that it is appropriate to use a Ni—Co alloy layer in the outermost layer portion of the plated layer and to control the Co/Ni value in the surface of the Ni—Co alloy layer, which is obtained by Auger electron spectroscopic analysis, in a range of 0.1 to 1.5.

In addition, in Patent Document 1 and Patent Document 2, the method for forming the Ni—Co alloy layer in the outermost layer of the plated layer is not particularly limited, and the following methods (i) to (iii) are exemplified.

(i) A method in which a Ni—Co alloy-plated layer is formed on a surface of a steel sheet using an alloy plating bath having Co/Ni in a predetermined range (ii) A method in which a Ni—Co alloy-plated layer is formed on a surface of a steel sheet using a Ni—Co alloy plating bath, and then a heat treatment is carried out to heat and diffuse the elements (iii) A method in which a Ni-plated layer and a Co-plated layer are formed in this order on a surface of a steel sheet, and then a heat treatment is carried out to heat and diffuse the elements In addition, Patent Document 3 below discloses a steel sheet for forming a battery can having an iron-nickel diffused layer or an iron-nickel/cobalt alloy diffused layer obtained by forming a nickel plated layer or a nickel/cobalt alloy-plated layer in a thickness of 0.5 to 2.0 μm on a surface of a steel sheet, which serves as a substrate, that becomes the inner surface of a battery can and then carrying out a heat diffusion treatment on such a nickel plated layer or nickel/cobalt alloy-plated layer, in which the average number of crystals per unit area (0.25 square meters) of the steel sheet, which serves as the substrate, is 12.3 or more.

Here, principal characteristics regarding workability, which are required by a steel sheet for a can including the above-described surface-treated steel sheet for a battery can, are (1) press formability (a property enabling forming without generating a defect such as a crack during working), (2) surface roughening resistance (a property of suppressing surface roughens to a small extent after pressing), (3) a low earring rate (a small anisotropy of a material and a property of suppressing the generation of an ear to a small extent after deep drawing), and (4) non-aging properties (a property of preventing the generation of stretcher strain during drawing).

In the related art, as a base steel sheet of a steel sheet for a can (particularly, a steel sheet for a battery can), an Al-killed steel sheet or an interstitial free (IF) steel-based steel sheet is used. Compared with the IF-based steel sheet, in the Al-killed steel sheet, it is somewhat difficult to ensure a high-level mean plastic strain ratio rm, but the refinement of ferrite crystal grains is easier than in the IF-based steel sheet, and consequently, it is possible to realize a steel sheet having excellent surface roughening resistance. In addition, continuous annealing for recrystallization is also possible at a relatively low temperature. When the IF-based steel sheet is compared with the Al-killed steel sheet, the refinement of ferrite crystal grains is somewhat more difficult than in the Al-killed steel sheet, and the recrystallization temperature is higher, and thus high-temperature annealing is required, but it is easy to ensure a high-level mean plastic strain ratio rm, and thus it is easy to ensure excellent formability.

The mean plastic strain ratio $r_m$ refers to a value defined by Expression (1)

$$r_m = (r_0 + 2 \times r_{45} + r_{90})/4 \qquad (I)$$

In Expression (I), $r_0$ is an r value in a rolling direction, $r_{90}$ is an r value in a direction orthogonal to the rolling direction, $r_{45}$ is an r value in a 45° direction, and the r value is a plastic strain ratio (Lankford value).

Therefore, even in the manufacturing of the above-described surface-treated steel sheet further coated with a Co plated layer on the Ni-plated layer or a surface-treated steel sheet obtained by carrying out a heat diffusion treatment on such a surface-treated steel sheet, it is usual to use an Al-killed steel sheet or an IF steel-based steel sheet as the base steel sheet from the viewpoint of ensuring workability.

As described above, recently, there has been a trend of using a surface-treated steel sheet having a Ni—Co alloy-plated layer in the surface layer area as, in particular, a material for a battery can, but there are problems described in (A) and (B) below.

(A) In an alkaline manganese battery in which a positive electrode current collector is used as a battery can, since the battery can is likely to be damaged at the time of charging $MnO_2$, which is a positive electrode active material, into the battery can, there is a case where it is necessary to provide a hard and thick plating while maintaining adhesion.

(B) Since Co for forming the Ni—Co alloy is a rarer metal than Ni and is thus expensive, it is necessary to reduce the amount of Co used as much as possible.

PRIOR ART DOCUMENT

Patent Document

[Patent Document 1] PCT International Publication No. WO2012/147843
[Patent Document 2] Japanese Unexamined Patent Application, First Publication No. 2016-186950
[Patent Document 3] PCT International Publication No. WO2016/158004
[Patent Document 4] Japanese Unexamined Patent Application, First Publication No. 2014-47359

Non-Patent Document

[Non-Patent Document 1] I. Serebrennikova, "Can-Cathode Interface in Alkaline $Zn/MnO_2$ Batteries: Optimization of Can Plating Composition", J. Electrochem. Soc., 2007, 154(9), C487-C493

DISCLOSURE OF THE INVENTION

Problems to be Solved by the Invention

An object of the present invention is to provide a surface-treated steel sheet that has a coating weight of at least 9.0 g/m² or more as the total amount of Ni and Co while ensuring the chemical and mechanical characteristics of a surface layer area of a plated layer that are almost identical or superior to those of a Ni—Co alloy plating of the related art, has a hard plated layer, and furthermore, has a base metal characteristic demanded as a base metal for a battery can.

Means for Solving the Problem

As a result of studying measures for achieving the above-described object, the present inventors obtained the following findings (a) to (e).

(a) It was found that, when Co plating is carried out on an upper layer of a Ni-plated steel sheet, and such a Co plating is heated and diffused (corresponding to (iii) described above) to ensure a Fe concentration of the outermost layer of the plated layer of 5 atom % or more (that is, some of Co in a Ni—Co plating (at least the surface layer area of the plated layer is a Ni—Co alloy) of the related art is substituted with Fe), it is possible to improve the scratch resistance of the plated layer and to ensure a conductive property and an electrolytic solution resistance suitable for a positive electrode current collector. That is, it was found that, when Fe is contained in a Ni—Co plated layer, even in the case of using the surface-treated steel sheet as a current collector for a battery having an alkaline aqueous solution used as an electrolytic solution, it is possible to suppress an increase in the surface resistance as in a Ni—Co plated layer. However, it was also clarified that, in a case where the Fe concentration is too high, Fe dissolves in the electrolytic solution, and, particularly in an alkaline manganese battery, there is an increasing possibility of causing the dissolution of Zn in a negative electrode that leads to liquid leakage. In the present specification, unless particularly otherwise described, the composition of the outermost layer of a plated layer refers to the composition of a surface measured by Auger electron spectroscopy (AES) after removing a contaminated layer or an oxide layer which may be present on the surface of the plated layer by argon ion etching.

(b) A hard and thick plated layer can be provided by, in (a) described above, carrying out Co plating on the upper layer of a Ni plating having a large coating weight and alloying Co and Ni by a heat treatment. In addition, based on the idea of (a) described above, when Fe is diffused up to the outermost layer of the plated layer, a soft Ni plated layer present in the lower layer changes to a hard Fe—Ni alloy layer, and thus it is possible to achieve an object of providing a hard and thick plated layer. In addition, as a result of the formation of the Fe—Ni alloy layer from the steel sheet side in the heat treatment process, the adhesion of the plated layer is enhanced.

(c) Regarding (b) described above, an increase in the coating weight of Ni plating or Co plating inevitably creates a necessity for a higher heating temperature or a longer heating time in order to diffuse Fe up to the outermost layer of the plated layer. As a result, crystal grains in the base steel sheet excessively grow, and it becomes impossible to ensure desired characteristics (particularly, surface roughening resistance). In addition, when the crystal grains in the base steel sheet become coarse, particularly, in a case where a thick Fe—Ni alloy layer is formed, a crack generated in the plated layer during working reaches the inside of the steel sheet in some cases. It should be noted that Patent Document 4 describes that, when the heat diffusion treatment is carried out on the Ni-plated steel sheet, the thickness of the Ni-plated layer before the diffusion treatment is preferably 1.0 µm or less (corresponding to a Ni coating weight of approximately 8.9 g/m² in terms of Ni). When the thickness of the Ni plated layer deviates from the above-described range, it is considered that Ni that is not alloyed with Fe remains in the surface layer portion of the plating. That is, in the related art, in a case where the coating weight of Ni plating exceeds 8.9 g/m², or in a case where the total coating weight of Ni and Co exceeds 8.9 g/m² in a Ni—Co bilayer plating, it is difficult to diffuse Fe up to the outermost layer of the Ni plated layer or the Ni—Co plated layer without impairing the characteristics of the base steel sheet.

(d) As described in (c) above, in a case where the Ni coating weight exceeds 8.9 g/m² in the Ni plated layer alone, in methods carried out in the related art, it is difficult to diffuse Fe up to the surface of the plated layer while maintaining the characteristics of the steel sheet of the base metal, and, as a result of the coarsening of base metal crystal grains, the surface roughening resistance suitable for steel sheets for cans degrades. Even in the case of a bilayer plating in which Ni plating is carried out and then a Co plated layer is formed, the above description applies almost similarly. In a case where the total coating weight of Ni and Co exceeds 8.9 g/m², in methods carried out in the related art, it is considered that it is difficult to diffuse Fe up to the outermost layer of the plated layer without causing the coarsening of the steel sheet of the base metal. However, when a Ni electro plating bath containing a chloride ion concentration of 35 g/L or more is employed at the time of carrying out Ni electro plating on the steel sheet, Ni—Co—Fe alloying during the heat diffusion treatment is significantly accelerated compared with a case where a Watts bath or the like is used.

(e) When an IF steel-based steel sheet is used as the base steel sheet, since the recrystallization temperature is high, in a case where the annealing of the steel sheet and the Ni—Co—Fe alloying of the plated layer are carried out at the same time by continuous annealing, the alloying treatment at a high temperature becomes possible, and thus it is easy to apply the use of the IF steel-based steel sheet even in a case where the total coating weight of Ni and Co is large.

Based on the above-described findings, the present inventors completed the surface-treated steel sheet of the present invention having a hard and thick plated layer and having a Ni—Co—Fe-based plated layer that is excellent in terms of the adhesion and the surface roughening resistance of the plated layer while suppressing the amount of Co used.

The gist of the present invention completed on the basis of such knowledge is as follows.

<1> A surface-treated steel sheet, including a base steel sheet and a Ni—Co—Fe alloy-plated layer positioned on at least one surface of the base steel sheet, in which, in the Ni—Co—Fe alloy-plated layer, a Ni coating weight is in a range of 7.1 to 32.5 g/m², a Co coating weight is in a range of 0.65 to 5.2 g/m², and furthermore, a total of the Ni coating weight and the Co coating weight is in a range of 9.0 to 35.0 g/m², in an outermost layer of the Ni—Co—Fe alloy-plated layer, a Co concentration is in a range of 20 to 60 atom %, and a Fe concentration is in a range of 5 to 30 atom %, in the Ni—Co—Fe alloy-plated layer, a region having a thickness of 2 μm or more, where a total of a Ni concentration and the Co concentration is 10 atom % or more and the Fe concentration is 5 atom % or more, is present, a chemical composition of the base steel sheet includes, by mass %, C: 0.001% to 0.020%, Si: 0.1% or less, Mn: 0.05% to 0.90%, P: 0.025% or less, S: 0.025% or less, sol. Al: 0.003% to 0.100%, N: 0.007% or less, and B: 0% to 0.0050%, the chemical composition further includes at least any one of 0.1% or less of Ti and 0.12% or less of Nb such that a relationship represented by Expression (1) is satisfied, a remainder consists of Fe and an impurity, and a ferrite grain size number of the base steel sheet, specified by JIS G 0551 (2013), is 9.0 or more.

$$(C/12+N/14)<(Ti/48+Nb/93)+0.001 \qquad \text{Expression (1)}$$

In Expression (1), C, N, Ti, and Nb represent contents (unit: mass %) of each of the elements.

<2> The surface-treated steel sheet according to <1>, in which, in the outermost layer of the Ni—Co—Fe alloy-plated layer, a total of the Fe concentration and the Co concentration may be 65 atom % or less, and the Co concentration may be higher than the Fe concentration.

<3> The surface-treated steel sheet according to <1> or <2>, in which the ferrite grain size number of the base steel sheet may be 10 or more.

<4> The surface-treated steel sheet according to any one of <1> to <3>, in which, in the Ni—Co—Fe alloy-plated layer, a ratio of the Co coating weight to the Ni coating weight may be in a range of 0.05 to 0.27.

<5> The surface-treated steel sheet according to any one of <1> to <4>, in which the surface-treated steel sheet may be used for a battery can.

<6> The surface-treated steel sheet according to any one of <1> to <4>, in which the surface-treated steel sheet may be used for a positive electrode current collector of a battery having an alkaline aqueous solution used as an electrolytic solution.

<7> The surface-treated steel sheet according to any one of <1> to <6>, in which the Co coating weight may be in a range of 0.9 to 5.2 g/m².

<8> A method for manufacturing a surface-treated steel sheet, the method including carrying out Ni plating on a steel sheet having the chemical composition of the base steel sheet according to <1> using a Ni plating bath having a chloride ion concentration of 35 g/L or more, carrying out Co plating on the steel sheet, and carrying out an alloying treatment on the steel sheet.

Effects of the Invention

As described above, according to the present invention, it becomes possible to provide a surface-treated steel sheet that has a coating weight of at least 9.0 g/m² or more as the total amount of Ni and Co while ensuring chemical and mechanical characteristics that are almost identical or superior to those of a Ni—Co alloy plating of the related art in the surface layer area of the plated layer, has a hard plated layer, and furthermore, has a base metal characteristic demanded as a base metal for a battery can.

BRIEF DESCRIPTION OF THE DRAWINGS

FIG. 2 is a flowchart showing an example of a flow of a method for manufacturing the surface-treated steel sheet according to the same embodiment.

EMBODIMENTS OF THE INVENTION

Hereinafter, a preferred embodiment of the present invention will be described in detail with reference to the accompanying drawings. In the present specification and the drawings, configurational elements having substantially the same function and configuration will be given the same reference symbol and will not be described again.

(Overall Configuration of Surface-Treated Steel Sheet)

Figure 1A:
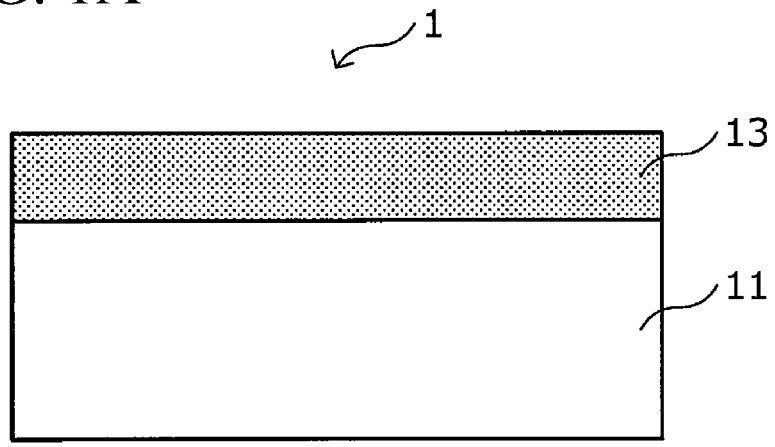
FIG. 1A is an explanatory view schematically showing a configuration of a surface-treated steel sheet according to an embodiment of the present invention.
Figure 1B:
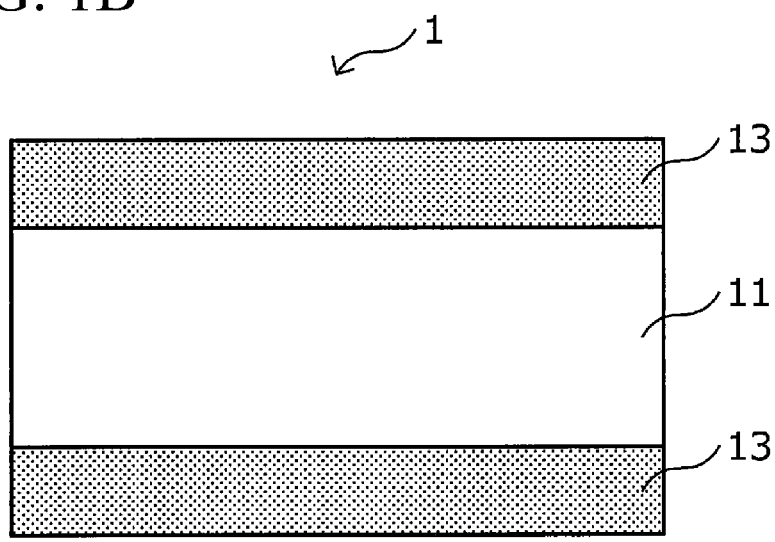
FIG. 1B is an explanatory view schematically showing the configuration of the surface-treated steel sheet according to the same embodiment.

First, the overall configuration of a surface-treated steel sheet according to the embodiment of the present invention will be described with reference to FIG. 1A and FIG. 1B. FIG. 1A and FIG. 1B are explanatory views schematically showing an example of the structure of the surface-treated steel sheet according to the present embodiment.

As schematically shown in FIG. 1A, a surface-treated steel sheet 1 according to the present embodiment includes at least a base steel sheet 11 and a Ni—Co—Fe alloy-plated layer 13 positioned on the base steel sheet 11. Here, the Ni—Co—Fe alloy-plated layer 13 according to the present embodiment may be provided on a single surface of the base steel sheet 11 as schematically shown in FIG. 1A or may be provided on both surfaces of the base steel sheet 11 as schematically shown in FIG. 1B.

The surface-treated steel sheet 1 according to the present embodiment can be used as a material for containers of a variety of batteries (battery containers) such as an alkaline manganese dry battery, a lithium ion battery, and a nickel-hydrogen battery and is worked to a shape of a desired battery container by a variety of press forming. The surface-treated steel sheet 1 according to the present embodiment can also be used as a material for positive electrode current collectors of batteries having an alkaline aqueous solution used as an electrolytic solution and is worked to a shape of a desired positive electrode current collector by a variety of press forming. Here, in a case where the Ni—Co—Fe alloy-plated layer 13 is provided on one surface of the base steel sheet 11 as shown in FIG. 1A, the Ni—Co—Fe alloy-plated layer 13 is preferably provided on a side of the base steel sheet 11 which will become an inner surface of the battery container or which will come into contact with the alkaline aqueous solution by press forming.

Here, in the present embodiment, as will be described in detail below, Ni plating and Co plating are sequentially carried out on the base steel sheet 101, and then alloying is carried out by heating, thereby forming the Ni—Co—Fe alloy-plated layer 13. Due to the above-described treatments, inside the Ni—Co—Fe alloy-plated layer 13, a concentration gradient is provided such that the Fe concentration decreases from the base steel sheet 101 side toward the surface of the Ni—Co—Fe alloy-plated layer 13, and, conversely, the Co concentration decreases from the surface of the Ni—Co—Fe alloy-plated layer 13 toward the inside direction of the Ni—Co—Fe alloy-plated layer 13.

Therefore, in the present embodiment, the "Ni—Co—Fe based alloy-plated layer 13" does not necessarily mean that the Ni—Co—Fe alloy-plated layer 13 is fully a ternary alloy of Ni, Co, and Fe.

(Regarding Base Steel Sheet 11)

Subsequently, the base steel sheet 11 in the surface-treated steel sheet 1 according to the present embodiment will be described in detail.

<Regarding Chemical Composition of Base Steel Sheet 11>

Hereinafter, the chemical composition of the base steel sheet 11 according to the present embodiment will be described in detail.

In the following description of the chemical composition, the expression "%" indicates "mass %" unless particularly otherwise described.

The base steel sheet 11 of the surface-treated steel sheet 1 according to the present embodiment is an IF steel-based base steel sheet. Among steel sheets having excellent press formability, the IF steel-based steel sheet, which will be focused on below, is capable of detoxifying carbon (C) present in the steel without carrying out an over-aging treatment by BAF after a heat treatment and is preferred as the base steel sheet for the surface-treated steel sheet 1 according to the present embodiment. In addition, since IF steel has a low C content, the diffusion of Fe easily proceeds, and furthermore, as described in detail below, the annealing temperature for recrystallization is high. Therefore, in a case where Ni plating and Co plating are carried out before annealing, Fe is likely to diffuse up to the outermost layer of the plated layer, and IF steel is also preferred as the base steel sheet of the surface-treated steel sheet 1 according to the present embodiment from such a viewpoint.

The base steel sheet 11 according to the present embodiment includes, by mass %, C: 0.001% to 0.020%, Si: 0.1% or less, Mn: 0.05% to 0.90%, P: 0.025% or less, S: 0.025% or less, sol. Al: 0.003% to 0.100%, N: 0.007% or less, and B: 0% to 0.005% and further contains at least any one of 0.1% or less of Ti and 0.12% or less of Nb such that a relationship represented by Expression (101) is satisfied, and the remainder includes Fe and an impurity.

$$(C/12+N/14)<(Ti/48+Nb/93)+0.001 \qquad \text{Expression (101)}$$

Here, in Expression (101), C, N, Ti, and Nb are the contents (unit: mass %) of each of the elements.

[C: 0.001% to 0.020%]

Carbon (C) is an element having an extremely large influence on formability and crystal grain refinement. Generally, as the content of C decreases, the steel sheet becomes softer, which is advantageous from the viewpoint of formability. However, conversely, it becomes difficult to refine ferrite crystal grains. On the other hand, as the content of C increases, it becomes easier for a solid solution of C to remain in steel. The solid solution of C also serves as a cause for stretcher strain. Even in a case where the content of C is large, it is possible to prevent the adverse influence of the solid solution of C by forming a carbide or a carbonitride with an element such as Nb or Ti, as long as the content of C is not in excess.

In the base steel sheet 11 according to the present embodiment, as described in detail below, the ferrite grain size number specified by "JIS G 0551 (2013): Steels-Micrographic determination of the apparent grain size" is set to 9.0 or more. In order to realize the above-described ferrite grain size number, in the base steel sheet 11 according to the present embodiment, the content of C is set to 0.001% or more. The content of C is preferably 0.0020% or more. In addition, in the case of intending the additional refinement of ferrite crystal grains, the content of C is more preferably set to 0.0050% or more.

In the present embodiment, as described above, Ti or Nb is contained in steel, thereby fixing a majority or all of the solid solution of C as at least any of a carbide or a carbonitride. At this time, when the content of C exceeds 0.020%, it becomes difficult to suppress the generation of the solid solution of C. Therefore, in the base steel sheet 11 according to the present embodiment, the content of C is set to 0.020% or less. The content of C is preferably 0.012% or less and more preferably 0.010% or less.

[Si: 0.1% or Less]

In the base steel sheet 11 according to the present embodiment, silicon (Si) is contained in steel as an impurity. In a case where the content of Si exceeds 0.1%, the steel is hardened, and the surface treatment property is degraded. Therefore, in the base steel sheet 11 according to the present embodiment, the content of Si is set to 0.1% or less. The content of Si is preferably 0.08% or less and more preferably 0.05% or less. The lower limit of the content of Si is not particularly limited and may be set to 0%. On the other hand, in order to reduce refining costs, the lower limit of the content of Si may be set to 0.002%, 0.005%, or 0.01%.

[Mn: 0.05% to 0.90%]

Manganese (Mn) is an element that prevents the degradation of hot ductility caused by sulfur (S) that is an impurity included in the base steel sheet 11. Such a hot ductility degradation-suppressing effect can be developed by setting the content of Mn to 0.05% or more. Therefore, in the base steel sheet 11 according to the present embodiment, the content of Mn is set to 0.05% or more. The content of Mn is preferably 0.08% or more. In addition, Mn stabilizes austenite and causes the Ar3 transformation point to fall and is thus capable of suppressing the recrystallization of austenite crystal grains during hot rolling and refining the austenite crystal grains. Furthermore, Mn is also an element that increases the strength of the steel sheet. When the content of Mn is set to 0.05% or more, it also becomes possible to develop the above-described austenite refinement effect or the above-described strength improvement effect. On the other hand, when the content of Mn is in excess, the steel sheet becomes hard, and formability significantly degrades. Such significant degradation of formability becomes significant in a case where the content of Mn exceeds 0.90%. Therefore, in the base steel sheet 11 according to the present embodiment, the content of Mn is set to 0.90% or less. The content of Mn is preferably 0.60% or less and more preferably 0.30% or less.

[P: 0.025% or Less]

Phosphorus (P) is contained in the base steel sheet 11 as an impurity. P is an element that contributes to strength, and thus up to 0.025% may be contained in the base steel sheet 11. However, P is an element that embrittles steel and impairs the workability, and thus, in the case of not intending to ensure the strength using P, the content of P is preferably set to 0.020% or less and more preferably set to 0.012% or less. From the viewpoint of toughness and workability, the content of P preferably becomes a lower value. The lower limit of the content of P is not particularly limited and may be set to 0%. On the other hand, in order to reduce refining costs, the lower limit of the content of P may be set to 0.001%, 0.002%, or 0.005%.

[S: 0.025% or Less]

Sulfur (S) is contained in the base steel sheet 11 as an impurity. S is an element that causes the degradation of hot ductility and generates an edge roughening defect or an edge crack in hot-rolled steel strips. Such degradation of hot ductility becomes significant in a case where the content of S exceeds 0.025%. Therefore, in the base steel sheet 11 according to the present embodiment, the content of S is set to 0.025% or less. The content of S is preferably 0.015% or less and more preferably 0.008% or less. Particularly, in a case where Ti is mainly used in order to fix a solid solution of N or the solid solution of C, there is a case where S bonds to Ti and impairs the effective action of Ti. Therefore, in a case where Ti is used to fix the solid solution of N or the solid solution of C, the content of S is preferably set to 0.0035% or less. In any case, the smaller the content of S, the more preferable, and the lower limit of the content may be set to 0%. However, the lower limit of the content of S is preferably set to approximately 0.0003% from the viewpoint of desulfurization costs. In order to reduce refining costs, the lower limit of the content of S may be set to 0.0005%, 0.001%, 0.002%, or 0.005%.

[sol. Al: 0.003% to 0.100%]

Aluminum (Al) is an element necessary for the deoxidation of steel and is also an element that fixes the solid solution of N in steel as AN and suppresses age hardening. In order to obtain these effects, the content of Al needs to be set to 0.003% or more. The content of Al is preferably 0.010% or more and more preferably 0.020% or more. On the other hand, when the content of Al is too large, the frequency of the generation of a surface defect attributed to an alumina cluster or the like rapidly increases. Such a frequency of the generation of a surface defect rapidly increases in a case where the content of Al exceeds 0.100%, and thus, in the base steel sheet 11 according to the present embodiment, the content of Al is set to 0.100% or less. The content of Al is preferably 0.080% or less and more preferably 0.070% or less. In the present embodiment, Al means acid-soluble Al (sol. Al).

[N: 0.007% or Less]

Nitrogen (N) is contained in the base steel sheet 11 as an impurity. N bonds to Al, Nb, or the like to form a nitride or a carbonitride and impairs hot ductility in some cases. Therefore, the smaller the content of N, the more preferable, and thus the lower limit of the content of N is not particularly limited and may be set to 0%. In addition, N is one of solid solution strengthening elements, causes age hardening, leads to the hardening of steel when contained in a large amount, and significantly degrades elongation to deteriorate formability. From such viewpoints, in the base steel sheet 11 according to the present embodiment, the content of N is set to 0.007% or less. The content of N is preferably 0.006% or less. Even when the content of N is decreased to less than 0.0005%, denitrification costs increase, and thus the lower limit of the content of N is preferably 0.0005%.

As simply described earlier, in the present embodiment, niobium (Nb) or titanium (Ti) is used to suppress, particularly, the solid solution of C, ensure formability, and suppress the coarsening of ferrite grains by pinning effect. Therefore, in the base steel sheet 11 according to the present embodiment, 0.12% or less of Nb or 0.1% or less of Ti or combination thereof is contained so as to satisfy a predetermined condition.

[Nb: 0% to 0.12%]

Niobium (Nb) is an effective element for decreasing the solid solution of C in steel by forming a carbide or a carbonitride and exhibits an effect of improving elongation or the r value. Furthermore, a carbonitride or carbide of Nb refines crystal grains by the pinning effect. In a case where the content of Nb exceeds 0.12%, the above-described crystal grain refinement action gets into a saturation state, the recrystallization temperature vainly increases, and recrystallization in continuous annealing becomes difficult. Therefore, in the base steel sheet 11 according to the present embodiment, the content of Nb is set to 0.12% or less. The content of Nb may be set to 0.11% or less, 0.10% or less, or 0.08% or less.

[Ti: 0% to 0.1%]

Titanium (Ti) is, similar to Nb, an element that fixes the solid solution of C in steel as a carbide or a carbonitride and suppresses the deterioration of deep drawability caused by the solid solution of C. In addition, Ti is precipitated as TiN at a high temperature, and thus, in a case where B is contained in steel, Ti suppresses the generation of boron nitride (BN) and facilitates the ensuring of free-B (B* described below). When Ti is excessively contained, there is a case where the recrystallization temperature raises or the degradation of toughness attributed to the coarsening of TiN is caused. Therefore, in the base steel sheet 11 according to the present embodiment, the content of Ti is set to 0.1% or less. The content of Ti may be set to 0.08% or less, 0.07% or less, or 0.06% or less.

As described above, Nb and Ti are elements having a similar effect from the viewpoint of fixing the solid solutions of C and N. Therefore, in the present embodiment, Nb or Ti or combination thereof is contained as long as Expression (101) is satisfied. Hereinafter, Expression (101) is reposted.

$$(C/12+N/14)<(Ti/48+Nb/93)+0.001 \quad \text{Expression (101)}$$

Here, '0.001' in the right elements of Expression (101) means that, even when the solid solution of C or the solid solution of N does not need to be completely fixed and an extremely small amount of the solid solution of N or C remains, such fact does not have a critical influence on formability (particularly, the generation of stretcher strain). The contents of Nb and Ti preferably satisfy a relationship represented by Expression (103).

$$(C/12+N/14)<(Ti/48+Nb/93)+0.0005 \quad \text{Expression (103)}$$

The total content of Nb and Ti preferably reaches 0.015 mass % or more and more preferably reaches 0.020 mass % or more as long as Expression (101) or Expression (103) is satisfied. In addition, one of Ti and Nb may not be included in the base steel sheet 11 as long as Expression (101) is satisfied. That is, the content of Ti or the content of Nb may be 0%.

[B: 0% to 0.005%]

Boron (B) is an optional element in the present embodiment. B has an effect of improving secondary work brittleness and is also an element having an action of suppressing age hardening attributed to N. Therefore, in the base steel sheet 11 according to the present embodiment, B can be contained as necessary. In order to obtain the above-described effect, B is preferably contained such that B* (free-B) defined by Expression (105) reached 0.0003 mass % or more.

$$B^*=B-(11/14)\times[N-(14/48)\times Ti] \quad \text{Expression (105)}$$

Here, in Expression (105), B, N, and Ti means the contents (unit: mass %) of the each of the elements, and, in a case where [N−(14/48)×Ti] is a negative value, B* is considered to be equal to B.

When the content of B is in excess, the steel sheet becomes hard making it difficult to increase the cold rolling reduction, the recrystallization temperature raises, and the earring rate increases. From the above-described viewpoints, in the base steel sheet 11 according to the present embodiment, the content of B is set to 0.005% or less. The content of B is preferably 0.0030% or less and more preferably 0.0025% or less. In addition, in the base steel sheet 11 according to the present embodiment, B* is preferably 0.0010% or less.

[Remainder]

In the base steel sheet 11 according to the present embodiment, the remainder of the chemical composition includes Fe and an impurity. Here, in the present embodiment, the impurity is assumed as an element mixed into the chemical composition from an ore as a raw material, scrap, a manufacturing environment, or the like at the time of industrially manufacturing an iron and steel material. As the impurity, for example, Cu, Ni, Cr, Sn, and the like can be exemplified. Preferred contents of these elements are Cu: 0.5% or less, Ni: 0.5% or less, Cr: 0.3% or less, and Sn: 0.05% or less.

In the surface-treated steel sheet 1 according to the present embodiment, in the case of assuming a use for a battery can, the base steel sheet 11 is preferably a cold-rolled steel sheet.

<Regarding Crystal Grain Size of Base Steel Sheet 11>

In the base steel sheet 11 according to the present embodiment, a crystal grain size number of ferrite grains (that is, the ferrite grain size number) is 9.0 or more. In a case where the crystal grain size number is less than 9.0, when the base steel sheet is formed into a can shape, the surface of a can trunk is likely to roughen, which is not preferable. The crystal grain size number of the ferrite grains in the base steel sheet 11 is preferably 10.0 or more, 10.5 or more, or 11.0 or more. The upper limit of the crystal grain size number of the ferrite grains in the base steel sheet 11 is not particularly specified, but there are many cases where it is difficult to set the crystal grain size number to more than 12.5. The upper limit of the crystal grain size number of the ferrite grains in the base steel sheet 11 may be set to 12.0 or less, 11.5 or less, or 11.0 or less.

The crystal grain size number of the ferrite grains in the present embodiment means the crystal grain size number of ferrite grains according to JIS G 0551 (2013). In JIS G 0551 (2013), the grain size number is defined as a value of G calculated by Expression (151) using the average number m of crystal grains per square millimeter of a test piece cross section, and the value of G can be a positive value, zero, or a negative value.

$$m=8\times2^G \quad \text{(Expression 151)}$$

Therefore, the crystal grain size number of the ferrite grains becomes the value of G calculated by Expression (151) using the average number m of crystal grains of ferrite per square millimeter of the test piece cross section. As is clear from Expression (151), a large crystal grain size number means that the average number m of crystal grains per square millimeter of the test piece cross section is large and means that ferrite grains are refined.

The above-described crystal grain size number of the ferrite grains can be measured according to the method specified by JIS G 0551 (2013) and can be measured using, for example, the comparison method described in Section 7.2 of JIS G 0551 (2013). In more detail, the crystal grain size number of the ferrite grains can be measured by observing a cross section parallel to a rolling direction (L direction) of the base steel sheet 11 throughout the overall thickness using the above-described comparison method.

Hitherto, the base steel sheet 11 in the surface-treated steel sheet 1 according to the present embodiment has been described in detail.

(Regarding Ni—Co—Fe Alloy-Plated Layer 13)

Subsequently, the Ni—Co—Fe alloy-plated layer 13 according to the present embodiment will be described in detail.

In the Ni—Co—Fe alloy-plated layer 13 included in the surface-treated steel sheet 1 according to the present embodiment, the plated layer is fully formed of a Ni—Co—Fe-based diffusion alloy-plated layer (in other words, Fe diffuses up to the surface of the Ni—Co—Fe alloy-plated layer 13). However, this does not mean that the plated layer 13 is necessarily fully formed of a Ni—Co—Fe alloy, and at least the outermost layer of the plated layer, that is, the surface of the plated layer and the vicinity thereof has a composition of a Ni—Co—Fe ternary alloy. A portion of the plated layer in the vicinity of the steel sheet 11 has a relatively small Co concentration and has a composition of a Ni—Fe binary alloy depending on cases. On the surface side of the base steel sheet 11, there is a case where a portion in which Ni diffuses to form a solid solution of Ni and which has a composition corresponding to α-Fe in the Fe—Ni phase diagram is observed (in this case, Ni present in the portion is included in the Ni coating weight in the measurement of the Ni coating weight using an acid dissolution method described below). The Ni—Co—Fe diffusion alloy plating according to the present embodiment is more basic than pure Ni and thus has characteristics that, even when a crack (defect portion) reaching the base steel sheet 11 is present in the plated layer, make it difficult to form a corrosion battery between the plated layer and Fe in the base steel sheet 11 and do not allow corrosion to easily proceed from the defect portion.

Since the surface-treated steel sheet 1 according to the present embodiment is intended to be a plated layer that is as thick as or thicker than at least a Ni diffusion-plated steel sheet having a Ni coating weight of 9.0 $g/m^2$ or more, the total of the Ni coating weight and the Co coating weight in the plated layer is set to 9.0 $g/m^2$ or more. In a case where the total of the Ni coating weight and the Co coating weight is less than 9.0 $g/m^2$, it becomes difficult to impart sufficient corrosion resistance to the surface-treated steel sheet. Meanwhile, the total of the Ni coating weight and the Co coating weight of the surface-treated steel sheet according to the present embodiment is set to 35 $g/m^2$ or less. This is because, when the total of the Ni coating weight and the Co coating weight exceeds 35 $g/m^2$, even with the means of the present invention, it becomes difficult to sufficiently diffuse Fe up to the outermost layer of the plated layer without causing the coarsening of the crystal grains in the base steel sheet. The total of the Ni coating weight and the Co coating weight is preferably 10 $g/m^2$ or more or 11 $g/m^2$ or more. The total of the Ni coating weight and the Co coating weight is preferably 30 $g/m^2$ or less and more preferably 25 $g/m^2$ or less.

<Regarding Ni Coating Weight>

In the Ni—Co—Fe alloy-plated layer 13 according to the present embodiment, the Ni coating weight is in a range of 7.1 to 32.5 $g/m^2$. Surface-treated steel sheets having a Ni coating weight of less than 7.1 $g/m^2$ (in other words, in consideration of the Co coating weight described in detail below, surface-treated steel sheets in which the thickness of the Ni—Co—Fe alloy-plated layer 13 is approximately less than 1.0 μm) can be realized with techniques of the related art in many cases and are considered to be outside the scope of the present invention. Therefore, the Ni coating weight of the Ni—Co—Fe alloy-plated layer 13 in the present embodiment is set to 7.1 $g/m^2$ or more. In a case where the Ni coating weight in the Ni—Co—Fe alloy-plated layer 13 exceeds 32.5 $g/m^2$, the Co coating weight becomes 2.5 $g/m^2$ or less, and it becomes difficult to ensure the Co concentration of the outermost layer of the plated layer after the alloying treatment. In the present embodiment, the Ni coating weight of the Ni—Co—Fe alloy-plated layer 13 is preferably 8.0 $g/m^2$ or more and more preferably 8.5 $g/m^2$ or more. The Ni coating weight of the Ni—Co—Fe alloy-plated layer 13 is preferably 27 $g/m^2$ or less and more preferably 22 $g/m^2$ or less.

<Regarding Co Coating Weight>

In the Ni—Co—Fe alloy-plated layer 13 according to the present embodiment, the Co coating weight is in a range of 0.65 to 5.2 $g/m^2$. In a case where the Co coating weight is less than 0.65 $g/m^2$, it becomes difficult to obtain the surface resistance-suppressing effect of the plated steel sheet after the alloying treatment. In a case where the Co coating weight exceeds 5.2 $g/m^2$, the manufacturing cost of the surface-treated steel sheet 1 according to the present embodiment increases, which is against the aim of the present invention, and thus such a Co coating weight is considered to be outside the scope of the present invention. In the present embodiment, the Co coating weight of the Ni—Co—Fe alloy-plated layer 13 is preferably 0.9 $g/m^2$ or more, 1.0 $g/m^2$ or more, or 1.2 $g/m^2$ or more. The Co coating weight of the Ni—Co—Fe alloy-plated layer 13 is preferably 3.2 $g/m^2$ or less or 2.5 $g/m^2$ or less.

<Ratio Between Ni Coating Weight and Co Coating Weight>

In the Ni—Co—Fe alloy-plated layer 13 according to the present embodiment, the ratio between the Ni coating weight and the Co coating weight (in more detail, the ratio of the Co coating weight with respect to the Ni coating weight) is preferably in a range of 0.05 or more and 0.27 or less. When the ratio between the Ni coating weight and the Co coating weight is set in the above-described range, it is possible to realize more excellent plating adhesion (that is, the adhesion of the Ni—Co—Fe alloy-plated layer 13) while realizing the reduction of more excellent charge transfer resistance, liquid leakage resistance (for example, alkaline dissolution resistance), and sliding ability. The ratio between the Ni coating weight and the Co coating weight is more preferably 0.06 or more or 0.08 or more. The ratio between the Ni coating weight and the Co coating weight is more preferably 0.22 or less or 0.20 or less.

Here, the Ni coating weight and the Co coating weight of the Ni—Co—Fe alloy-plated layer 13 can be specified by dissolving only the Ni—Co—Fe alloy-plated layer 13 by a well-known method in which an acid (for example, a mixed acid of concentrated hydrochloric acid and concentrated nitric acid [volume fraction of 1:1]) is used and then analyzing the obtained solution by inductively coupled plasma (ICP) emission spectroscopy. In addition, it is possible to compute the above-described ratio based on the specified Ni coating weight and Co coating weight.

<Regarding Co, Fe, and Ni Concentrations of Outermost Layer of Ni—Co—Fe Alloy-Plated Layer>

As described above, in the Ni—Co—Fe alloy-plated layer 13 according to the present embodiment, Fe diffuses up to the outermost layer of the plated layer. Therefore, it is possible to specify the Co concentration, the Fe concentration, and the Ni concentration of the outermost layer of the Ni—Co—Fe alloy-plated layer 13.

In the outermost layer of the Ni—Co—Fe alloy-plated layer 13 according to the present embodiment, the Co concentration is in a range of 20 to 60 atom %, and the Fe concentration is in a range of 5 to 30 atom %. It should be noted that such a composition is the atom percentage when the sum of the Ni concentration, the Co concentration, and the Fe concentration is set to 100 atom %.

In a case where the Co concentration of the outermost layer of the plated layer is less than 20 atom %, it is not possible to sufficiently reduce the charge transfer resistance on the surface of the surface-treated steel sheet 1, and it is not possible to ensure the alkali resistance. The Co concentration is preferably 25 atom % or more and more preferably 30 atom % or more. In a case where the Co concentration of the outermost layer of the plated layer exceeds 60 atom %, the liquid leakage resistance degrades. In addition, in the surface-treated steel sheet 1 according to the present embodiment, Fe is diffused up to the surface of the Ni—Co—Fe alloy-plated layer 13, whereby the action of Co that contributes to the reduction of the charge transfer resistance and the imparting of the liquid leakage resistance (for example, alkaline dissolution resistance) and the sliding ability is replaced or assisted by Fe, and thus it is possible to reduce the Co coating weight. As a result, in the surface-treated steel sheet 1 according to this embodiment, it is possible to set the Co concentration of the outermost layer of the plated layer 13 to 60 atom % or less and to reduce the manufacturing cost. The Co concentration of the outermost layer of the plated layer 13 is preferably 55 atom % or less and more preferably 52 atom % or less.

In a case where the Fe concentration of the outermost layer of the plated layer is less than 5 atom %, the sliding ability of the Ni—Co—Fe alloy-plated layer 13 is insufficient, and the adhesion or the like to a die during pressing is likely to occur, which is not preferable. In addition, Fe also, similar to Co, has an action of reducing the charge transfer resistance on the surface of the plated layer 13 of the surface-treated steel sheet 1, and inclusion of Fe in the outermost layer of the plated layer has an effect of reducing expensive Co. The Fe concentration of the outermost layer of the plated layer is preferably 8 atom % or more and more preferably 12 atom % or more. In a case where the Fe concentration of the outermost layer of the plated layer exceeds 30 atom %, rust is likely to be generated from the Ni—Co—Fe alloy-plated layer 13, which is not preferable. The Fe concentration of the outermost layer of the plated layer is preferably 24 atom % or less and more preferably 20 atom % or less.

In addition, in the outermost layer of the Ni—Co—Fe alloy-plated layer 13 according to the present embodiment, the total of the Co concentration and the Fe concentration is preferably 65 atom % or less, and the Co concentration of the outermost layer is preferably higher than the Fe concentration of the outermost layer. When the total of the Co concentration and the Fe concentration reaches 65 atom % or less, it becomes possible to more reliably improve the liquid leakage resistance (for example, alkaline dissolution resistance). The total of the Co concentration and the Fe concentration of the outermost layer of the plated layer is more preferably in a range of 32 to 60 atom %.

The Co concentration, the Fe concentration, and the Ni concentration of the outermost layer of the Ni—Co—Fe alloy-plated layer 13 can be measured by Auger electron spectroscopy (AES). In this case, in order to remove a contaminated layer (for example, an oxide layer or the like), which is possibly formed on the surface of the surface-treated steel sheet 1, a portion as thick as, for example, 10 nm from the surface layer of the surface-treated steel sheet 1 in terms of $SiO_2$ is removed by argon ion etching in an AES device. It should be noted that the etching amount in terms of $SiO_2$ means the etching depth in a case where a material to be etched is $SiO_2$. The etching amount by argon ion etching differs depending on the kind of the material to be etched even when the etching conditions are the same. Therefore, it is normal to estimate the etching amount based on the relationship between the etching condition and the etching amount for a standard substance ($SiO_2$).

After that, in consideration of the non-uniformity in measurement values attributed to measurement positions, the Ni, Co, and Fe concentrations are measured using the AES device at nine random positions, and the average values of the measurement values at five positions remaining after excluding two positions with the first and second highest measurement values and two positions with the first and second lowest measurement values are computed. The average values obtained at this time can be considered as the composition of the outermost layer of the surface-treated steel sheet 1.

<Thickness of Region where Fe Concentration is 5 Atom % or More>

In the Ni—Co—Fe alloy-plated layer 13 according to the present embodiment, a region having a thickness of 2 μm or more, where the Fe concentration is 5 atom % or more (in more detail, a region where the total of the Ni concentration and the Co concentration is 10 atom % or more and the Fe concentration is 5 atom % or more) is present. Hereinafter, the region where the total of the Ni concentration and the Co concentration is 10 atom % or more and the Fe concentration is 5 atom % or more will be referred to as "Fe diffusion region". In a case where the thickness of the Fe diffusion region is less than 2 μm, it is not possible to set the Fe concentration of the outermost layer of the Ni—Co—Fe alloy-plated layer 13 to 5 atom % or more. In a case where the Fe diffusion region having a thickness of 2 μm or more is present in the surface-treated steel sheet 1 according to the present embodiment, it is considered that a defect that reaches a wide range of the base material is not easily generated by sliding of an active material when the active material is inserted into a battery. The thickness of the region where the Fe concentration is 5 atom % or more may be set to 2.1 μm or more, 2.2 μm or more, or 2.5 μm or more. The upper limit of the thickness of the region where the Fe concentration is 5 atom % or more is not particularly limited.

The thickness of the above-described Fe diffusion region can be specified by linearly analyzing the cross section of the Ni—Co—Fe alloy-plated layer 13 according to the present embodiment using AES to measure the distribution states of the Ni element, the Co element, and the Fe element in the Ni—Co—Fe alloy-plated layer 13.

First, for a sample under focus, a polishing treatment is carried out on an L-section (a cross section parallel to a rolling direction and a sheet thickness direction), and then a portion as thick as 50 nm from the surface layer of the sample cross section in terms of $SiO_2$ is argon-ion-etched by argon ion etching in the AES device, thereby removing a worked layer generated by the polishing treatment. After that, a linear analysis in the thickness direction of the plated layer is carried out using the AES device. The region where the total of the Ni concentration and the Co concentration is 10 atom % or more and the Fe concentration is 5 atom % or more is extracted by analyzing the obtained analysis result, whereby the thickness of such a region is specified. At this time, in consideration of the non-uniformity in measurement values attributed to measurement positions, it is preferable to carry out the linear analysis using the AES device at nine random positions and to compute the average value of the measurement values of thickness at five positions remaining after excluding two positions with the first and second highest measurement values and two positions with the first and second lowest measurement values.

Hitherto, the Ni—Co—Fe alloy-plated layer 13 according to the present embodiment has been described in detail.

The surface-treated steel sheet according to the present embodiment as described above is capable of suppressing an increase in the surface resistance while realizing the reduction of the Co content. In addition, the surface-treated steel sheet according to the present embodiment has the Ni—Co—Fe alloy-plated layer in which Fe diffuses up to the outermost layer of the plated layer, whereby the plated layer does not easily peel off, and the Ni—Co—Fe alloy-plated layer is a hard and thick plated layer. Therefore, a defect that reaches up to the steel sheet of the base metal is not easily generated at the time of inserting an active material. Furthermore, in the surface-treated steel sheet according to the present embodiment, since the microstructure of the base steel sheet is formed of fine ferrite crystal grains, a crack that reaches up to the base steel sheet is not easily generated regardless of the fact that the Ni—Co—Fe alloy-plated layer is a hard and thick layer. As described above, the surface-treated steel sheet according to the present embodiment is capable of improving the adhesion and workability of an alloy plating having a predetermined thickness while suppressing the Co coating weight.

(Regarding Method for Manufacturing Surface-Treated Steel Sheet)

Subsequently, a method for manufacturing the surface-treated steel sheet according to the present embodiment will be described in detail with reference to FIG. 2. The method for manufacturing the surface-treated steel sheet according to the present embodiment includes:

(S101) plating Ni on a steel sheet having the chemical composition of the base steel sheet 11 using a Ni plating bath in which the chloride ion concentration is 35 g/L or more and the Ni ion concentration is 40 g/L or more such that the Ni coating weight falls in a range of 7.1 to 18.5 g/m$^2$;

(S103) plating Co on the steel sheet; and (S105) carrying out an alloying treatment on the steel sheet.

FIG. 2 is a flowchart showing an example of the flow of the method for manufacturing the surface-treated steel sheet according to the present embodiment.

In the manufacturing of the surface-treated steel sheet (particularly, a steel strip), which will be focused on in the present embodiment, it is preferable that, prior to continuous annealing a cold-rolled steel sheet, a pre-cleansing treatment be carried out on an IF steel-based cold-rolled steel sheet, Ni plating and Co plating be carried out, and then continuous annealing be carried out. This is because, in such a case, the recrystallization of the base steel sheet and Ni—Co—Fe alloying can be carried out at the same time during continuous annealing, which is rational. On the basis of such an idea, the method for manufacturing the surface-treated steel sheet, which will be described below in detail, has processes as shown in FIG. 2.

That is, the method for manufacturing the surface-treated steel sheet for a battery container according to the present embodiment incudes three stages of, as shown in FIG. 2, plating Ni on a base steel sheet (S101), plating Co on the Ni-plated base steel sheet (S103), and carrying out an alloying treatment on the Ni and Co-plated base steel sheet (S105).

Here, steelmaking conditions for obtaining the base steel sheet, which will be subjected to the Ni plating, are not particularly limited, and the base steel sheet can be obtained by melting steel having a chemical composition as described above to produce a cast piece (IF steel-based cast piece) and carrying out well-known processes of hot rolling and cold rolling.

<Ni Plating>

In the Ni plating (S101), a Ni plated layer is formed on the surface of the base steel sheet by carrying out electroplating on the obtained base steel sheet (cold-rolled steel sheet) using a high chloride bath.

In the method for manufacturing the surface-treated steel sheet according to the present embodiment, an electro plating method is preferably employed in which a specific chloride bath (that is, a high chloride bath) is used in carrying out Ni plating on the cold-rolled steel sheet. In such a case, it becomes possible to accelerate the alloying of the Ni plating during alloying in the latter stage, and, as long as the plating thickness of the Co plating is approximately 0.6 μm or less (that is, the Co coating weight is 5.2 g/m$^2$ or less), even in a case where the total coating weight of Ni and Co is 9.0 g/m$^2$ or more, it is possible to set the Fe concentration of the outermost layer of the plated layer to 5 mass % or more without causing the coarsening of the crystal grains of the base steel sheet (that is, even when the total coating weight of Ni and Co is 9.0 g/m$^2$ or more, it is possible to diffuse Fe up to the outermost layer of the plated layer while maintaining a state in which the crystal grains in the base steel sheet are refined).

Here, the plating bath used for Ni electro plating is preferably a high chloride bath in which an electrolytic solution having a chloride ion concentration of 35 g/L or more and a Ni ion concentration of 40 g/L or more is used. When Ni plating is carried out using such a high chloride bath, the Ni—Co—Fe alloying is significantly accelerated in the alloying treatment (S105) in the latter stage. The reason therefor is not clear, but it is assumed that, probably, an internal stress generated in an electrocrystallized membrane affects the alloying.

Regarding the specific composition of the high chloride bath used in the electro plating, the chloride ion concentration of the Ni plating bath is preferably 35 g/L or more. In a Watts bath that is broadly used for Ni plating, the chloride ion concentration is approximately 8.9 to 17.9 g/L (30 to 60 g/L in teens of nickel chloride-hexahydrate). Compared with Ni electrocrystallized from the Watts bath, in Ni electrocrystallized from the Ni plating bath having a chloride ion concentration of 35 g/L or more, the internal stress is large, and the diffusion of Fe in the plated layer is fast. The upper limit of the chloride ion concentration is not particularly limited; however, from the viewpoint of the solubility of nickel chloride, the chloride ion concentration is preferably set to 150 g/L or less. The chloride ion concentration of the Ni plating bath is preferably 45 g/L or more or 50 g/L or more. The chloride ion concentration of the Ni plating bath is preferably 120 g/L or less or 110 g/L or less.

When the Ni ion concentration of the Ni plating bath is too low, the current efficiency decreases, and there is a case where sufficient productivity cannot be obtained. Therefore, the Ni ion concentration is preferably set to 40 g/L or more. However, in the case of forming the plating for a long period of time at the sacrifice of productivity, it is possible to obtain a favorable surface-treated steel sheet even when the Ni ion concentration is less than 40 g/L. The upper limit of the Ni ion concentration is not particularly limited; however, from the viewpoint of the solubility of nickel chloride, the Ni ion concentration is preferably set to 125 g/L or less. The Ni ion concentration of the Ni plating bath is preferably 45 g/L or more or 60 g/L or more. The Ni ion concentration of the Ni plating bath is preferably 110 g/L or less or 100 g/L or less.

Here, a sulfate ion in the Ni plating bath is not particularly limited, and the Ni plating bath may be a pure chloride bath not including any sulfate ion or a bath in which the sulfate ion concentration is higher than the chloride ion concentration as in the Watts bath. Boric acid contained in the Watt bath is also not particularly limited; however, when boric acid is contained in a range of 15 to 60 g/L in, similarly, the Watt bath, it becomes possible to stabilize the pH of the plating bath, which is preferable. In addition, as a cation, the Ni plating bath may include, in addition to a Ni ion, for example, as a cation of a supporting electrolyte or the like, a Na ion that is not electrocrystallized from an aqueous solution.

The pH of the Ni plating bath is also not particularly limited as long as the pH is in a weak acidic range. However, when the pH is too low, the steel sheet is likely to dissolve, and, when the pH is too high, a plating burn is likely to be generated, and thus the pH of the Ni plating bath is preferably 2.5 or more and 5.0 or less.

Regarding a gloss additive that is often added to the Watts bath, a primary gloss additive represented by saccharine sodium has an action of relaxing the internal stress of the Ni plate and is thus preferably not positively added. In addition, a secondary gloss additive represented by 1,4-butynediol has an effect of increasing the internal stress of the Ni plate, but there is a case where the diffusion is impaired by eutectoid C, and thus the secondary gloss additive is preferably not positively added.

The temperature of the Ni plating bath (bath temperature) is not particularly limited, and the effect of the above-described plating bath can be obtained by setting the bath temperature in a well-known temperature range. However, in a case where the bath temperature is too low, there is a possibility that the current efficiency may decrease or the stress may become relatively low. In a case where the bath temperature is too high, there is a possibility that a Ti basket, which is a positive electrode and into which a Ni chip is stuffed, or a Ti sheet of a substrate of an insoluble positive electrode (for example, an electrode in which a Ti substrate is coated with $IrO_2$ or the like) may easily dissolve. Therefore, in order to more reliably carry out an operation, the bath temperature of the Ni plating bath is preferably set to 40° C. or higher and 60° C. or lower.

A current density at the time of carrying out the Ni electro plating is not particularly limited, and the above-described effect of the plating bath can be obtained by setting the current density in a well-known current density range. However, in a case where the current density is too low, there is a possibility that the productivity may decrease. In a case where the current density is too high, there is a possibility that the current efficiency may decrease or a plating burn may be generated. Therefore, in order to more reliably carry out an operation, the current density at the time of carrying out the Ni electro plating is preferably 5 $A/dm^2$ or more and 50 $A/dm^2$ or less. In the case of using a liquid cushion cell horizontal (LCC-H)-type plating cell [liquid cushion cell-horizontal type, refer to, for example, Tetsu-to-Hagane: The journal of the Iron and Steel Institute of Japan, 71 (13), S1276, 1985-09-05], which is capable of smoothly supplying an ion by a high-speed flow, the Ni electro plating may be carried out at a higher current density.

Even when a cold-rolled steel sheet that has been annealed after cold rolling is used as a plating precursor for the above-described Ni electro plating, the effect of the above-described plating bath can be obtained. However, in order to further accelerate the diffusion of Fe, as described above, a cold-rolled steel sheet that is not annealed after cold rolling is preferably used. This is because, in the cold-rolled steel sheet that is not annealed after cold rolling, the strain energy in the steel sheet is large and thus Fe more easily diffuses in the cold-rolled steel sheet that is not annealed after cold rolling.

<Co Plating>

In the Co plating (S103), Co plating is carried out on the base steel sheet on which the Ni plated layer has been formed to form a Co plated layer on the Ni plated layer. The Co plated layer can also be formed by electroplating using a variety of plating baths that are normally used in Co plating. Examples of such a Co plating bath include a Co plating bath having a bath composition of $CoSO_4.7H_2O$: 240 to 330 g/L, $H_3BO_3$: 20 to 55 g/L, HCOOH: 15 to 30 g/L, $H_2SO_4$: 0.5 to 3 g/L. The Co plated layer can be formed by carrying out electroplating using such a plating bath at a pH of the plating bath of 2 to 3 and a bath temperature of 50° C. to 60° C. under a condition of a current density of 1 to 40 $A/dm^2$.

In the above-described Ni plating and the above-described Co plating, a Ni plated layer and a Co plated layer each having a desired coating weight are formed by appropriately adjusting a variety of the electroplating conditions described above, including the conduction time or the like, such that the coating weight falls in the above-described range.

<Alloying Treatment>

In the alloying treatment (S105), an alloying treatment is carried out on the base steel sheet on which the Ni plated layer and the Co plated layer have been formed to recrystallize the base steel sheet, and to heat Fe in the base steel sheet, the Ni plated layer, and the Co plated layer so that they are diffused to form the Ni—Co—Fe alloy-plated layer 13. The alloying treatment according to the present embodiment is a heat treatment that is carried out according to a predetermined heat treatment condition, and is an annealing from the viewpoint of the base steel sheet and an alloying treatment from the viewpoint of the plated layer.

Here, the heat treatment for annealing and alloying is preferably carried out by continuous annealing rather than box annealing. In the case of box annealing, there is a possibility that crystal grain sizes or characteristics may become non-uniform due to the unevenness of the temperature distribution in a coil. In addition, in the box annealing, a steel sheet coiled in a coil shape is heat-treated, and thus there is a possibility that, in the case of single-surface plating, the plated surface and the steel sheet surface may adhere to each other and, in the case of both-surface plating, the plated surfaces may adhere to each other, which generate a defect on the surface.

In the heat treatment by continuous annealing (alloying treatment), the annealing atmosphere is preferably set to a non-oxidizing atmosphere such as $N_2+H_2$ (for example, $N_2$+2% to 4% $H_2$). In addition, the soaking temperature is preferably in a range of 740° C. to 850° C. and more preferably in a range of 750° C. to 820° C. In addition, the soaking time is preferably in a range of 5 to 180 seconds and more preferably in a range of 10 to 60 seconds. When the heat treatment is carried out at the above-described soaking temperature for the above-described soaking time, it becomes possible to realize a desired ferrite grain size number by recrystallizing the base steel sheet, and it becomes possible to produce the Ni—Co—Fe alloy-plated layer 13 in which the Fe concentration of the outermost layer of the plated layer is 5% to 30 atom % or more by diffusing Fe in the steel sheet up to the outermost layer of the plated layer. It should be noted that the above-described soaking temperature and the above-described soaking time are far lower and shorter than those in normal alloying treatments. Therefore, according to technical common knowledge, it is considered to be difficult to obtain a Ni—Co—Fe alloy-plated layer in which the total of the Ni coating weight and the Co coating weight is 9.0 $g/m^2$ or more and the Fe concentration of the outermost layer is 5 atom % or more under the above-described alloying treatment conditions. However, in the method for manufacturing the surface-treated steel sheet according to the present embodiment, since a predetermined amount of a chloride ion concentration is included in the component of the Ni plating bath, it is possible to sufficiently diffuse Fe up to the surface of the Ni—Co—Fe alloy-plated layer even under the above-described alloying treatment conditions.

In a case where the soaking temperature is lower than 740° C., it becomes difficult to set the Fe concentration of the outermost layer of the plated layer to 5 atom % or more even when the soaking time is set to 180 seconds, and there is a possibility that the recrystallization of the base steel sheet may become insufficient and the mean plastic strain ratio $r_1$ may decrease. In a case where the soaking temperature exceeds 850° C., there is an increasing concern that crystal grains may coarsen and it may be impossible to ensure a target crystal grain size number even when the soaking time is set to five seconds. In the alloying treatment according to the present embodiment, the soaking temperature is more preferably in a range of 760° C. to 820° C., and the soaking time is more preferably in a range of 15 to 60 seconds.

The soaking temperature is desirably set to 820° C. or lower for the component ranges of the base steel sheet according to the present embodiment except for the component ranges of C: 0.0060% to 0.0110%, 500×[C]≤[Nb]/[C]≤8.0, and N: less than 0.0025%. In a case where the soaking temperature exceeds 820° C., there is an increasing concern that the crystal grains in the base steel sheet may coarsen.

Hitherto, the method for manufacturing the surface-treated steel sheet according to the present embodiment has been described in detail.

In the method for manufacturing the surface-treated steel sheet according to the present embodiment, an over-aging treatment may not be carried out because, basically, the components are designed such that an excess solid solution of C does not remain in the steel sheet due to Ti or Nb. However, it is not inhibited to carry out an over-aging treatment, for example, in a temperature range of 400° C. to 500° C.

In addition, on the steel sheet on which the alloying treatment (furthermore, the over-aging treatment that is carried out as necessary) has been carried out, temper rolling (skin pass rolling) may be carried out. The rolling reduction of the temper rolling is preferably set to, for example, 0.5% to 10.0%. In a case where the rolling reduction is less than 0.5%, there is a possibility that yield point elongation may occur due to aging at normal temperature. In a case where the rolling reduction exceeds 10.0%, there is a possibility that the total elongation (EL) may decrease and the press formability (drawability) may degrade. When temper rolling having a rolling reduction in a range of 0.5% to 10.0% is carried out, it is possible to almost completely suppress the generation of stretcher strain, and excellent press formability can be ensured, which is preferable. In addition, when temper rolling having a rolling reduction in a range of 3.5% or less is carried out, it is possible to manufacture a surface-treated steel sheet having a more favorable shape, and it becomes possible to adjust the yield strength by appropriately selecting the degree of the temper rolling.

With the manufacturing processes described above, the surface-treated steel sheet according to the present embodiment is manufactured. Here, the sheet thickness (final sheet thickness) of the surface-treated steel sheet according to the present embodiment is preferably 0.08 to 1.2 mm, more preferably 0.15 to 0.80 mm, and still more preferably in a range of 0.15 to 0.50 mm. In a case where the final sheet thickness exceeds 1.2 mm, there is a case where it becomes difficult to obtain excellent drawability. In a case where the final sheet thickness is less than 0.08 mm, the sheet thickness of the hot-rolled steel sheet needs to be thin, and there is a case where the operation of the hot rolling becomes difficult.

EXAMPLES

Subsequently, the surface-treated steel sheet according to the present invention will be specifically described while describing examples and comparative examples. The examples described below are simply examples of the surface-treated steel sheet according to the present invention, and the surface-treated steel sheet according to the present invention is not limited to the examples described below.

In all of the examples and the comparative examples described below, on non-annealed IF steel and comparative steel (all were 300 mm in length and 200 mm in width) that had been cold-rolled to 0.25 mm, Ni plating and Co plating were carried out by electro plating and then a heat treatment simulating a continuous annealing line was carried out.

The chemical compositions of the cold-rolled steel sheets used in the present experimental examples are summarized in Table 1. Here, the kinds of steels having a blank field in the column of boron (B), titanium (Ti), or niobium (Nb) in Table 1 indicate that the content thereof is equal to or lower than an impurity level (for B, the content is less than 0.0001 mass %).

TABLE 1

| | Composition of base material (mass %, remainder is Fe and impurity) | | | | | | | | | | |
|---|---|---|---|---|---|---|---|---|---|---|---|
| Base material | C | Si | Mn | P | S | sol. Al | N | B | Ti | Nb | Expression 101 right side − left side |
| 1 | 0.0095 | 0.01 | 0.10 | 0.007 | 0.013 | 0.051 | 0.0022 | | | 0.045 | 0.00054 |
| 2 | 0.0190 | 0.01 | 0.20 | 0.010 | 0.010 | 0.049 | 0.0017 | | 0.032 | 0.013 | 0.00010 |
| 3 | 0.0050 | 0.01 | 0.15 | 0.012 | 0.010 | 0.030 | 0.0018 | | | 0.020 | 0.00067 |
| 4 | 0.0048 | 0.01 | 0.15 | 0.010 | 0.010 | 0.020 | 0.0035 | | 0.008 | 0.020 | 0.00073 |
| 5 | 0.0019 | tr. | 0.21 | 0.008 | 0.010 | 0.041 | 0.0012 | 0.0006 | 0.017 | 0.027 | 0.00140 |
| 6 | 0.0010 | 0.01 | 0.19 | 0.010 | 0.011 | 0.051 | 0.0017 | 0.0002 | 0.032 | 0.013 | 0.00160 |
| 7 | 0.0115 | 0.01 | 0.10 | 0.008 | 0.015 | 0.045 | 0.0022 | | | | −0.00012 |
| 8 | 0.0190 | 0.01 | 0.20 | 0.010 | 0.010 | 0.049 | 0.0017 | | 0.032 | 0.013 | 0.00010 |

After the cold rolling, the steel sheets were cleaned by alkaline defatting and pickling according to an ordinary method. After that, Ni plating was carried out by electro plating. Ni plating baths used are summarized in Table 2. For each of the plating baths shown in Table 2, the pHs of the plating baths were adjusted using basic nickel carbonate [Ni$_4$CO$_3$(OH)$_6$(H$_2$O)$_4$], and the plating bath temperatures were commonly set to 60° C. In addition, as positive electrodes, Ni sheets having a purity of 99.9% or higher were used, and negative electrode current densities were commonly set to 20 A/dm$^2$. In Table 2, the expression "high Cl bath" means "high chloride bath". In addition, in the case of using a Ni—Co bath, Co plating was not separately carried out.

TABLE 2

| Plating bath | Concentration of compositions | | | | | | |
|---|---|---|---|---|---|---|---|
| | Nickel sulfate · 6H$_2$O | Nickel chloride · 6H$_2$O | Cobalt sulfate · 6H$_2$O | Boric acid | Chloride ion concentration | Nickel ion concentration | pH |
| Sulfuric acid bath | 350 | 0 | — | 40.0 | 0.0 | 78.1 | 4.0 |
| Watts bath | 300 | 40 | — | 40.0 | 11.9 | 76.9 | 4.0 |
| High Cl bath 1 | 200 | 150 | — | 40.0 | 44.7 | 81.7 | 4.0 |
| High Cl bath 2 | 0 | 150 | — | 40.0 | 44.7 | 37.0 | 4.0 |
| High Cl bath 3 | 0 | 250 | — | 40.0 | 74.6 | 61.7 | 4.0 |
| High Cl bath 4 | 0 | 350 | — | 40.0 | 104.4 | 86.4 | 4.0 |
| Ni-Co bath | 300 | 40 | 120 | 40.0 | 11.9 | 76.9 | 4.0 |

After Ni plating, Co plating was carried out using a Co plating bath containing CoSO$_4$.7H$_2$O: 300 g/L, H$_3$BO$_3$: 45 g/L, HCOOH: 23 g/L, H$_2$SO$_4$: 1.3 g/L and having a pH of 2.6. The plating bath temperatures were commonly set to 55° C. In addition, as positive electrodes, Co sheets having a purity of 99.9% or higher were used, and negative electrode current densities were commonly set to 20 A/dm$^2$.

As a basis for evaluation in the present experimental examples, a sample on which Co plating was not carried out after Ni plating using a Watts bath was separately prepared.

On the steel sheets on which the above-described plating treatment had been carried out, a heat treatment simulating a continuous annealing line (that is, an alloying treatment) was carried out in an atmosphere including 4 vol % of H$_2$ and a remainder of N$_2$. On the plated steel sheets that had been subjected to such a heat treatment, temper rolling was carried out to a rolling reduction of 1.8%.

The types of Ni plating baths used at the time of Ni plating in the test examples, the coating weights of Ni plating and Co plating, and alloying conditions (the soaking temperature and the soaking time) after plating are shown together in Table 3.

On each of the surface-treated steel sheets obtained by the above-described method, the following evaluations were carried out.

[Microstructure Observation and Crystal Grain Size Number Measurement]

Optical microscopic observation was carried out on L-sections (cross sections parallel to a rolling direction and a sheet thickness direction) of each of the surface-treated steel sheets, and the microstructures of the cold-rolled steel sheets were specified. As a result, the microstructures of each of the surface-treated steel sheets were all found to be a ferrite single-phase microstructure. Furthermore, the crystal grain size number of ferrite grains in the surface-treated steel sheet of each test number was obtained by the above-described method according to JIS G 0551 (2013). The obtained results are shown together in Table 3.

[Co Concentration, Fe Concentration, Ni Concentration of Outermost Layer of Plated Layer], A 10 mm×10 mm sample was obtained by punching from the central part of each of the surface-treated steel sheets manufactured as described above and used as a measurement sample. Each of the Co concentration, the Fe concentration, and the Ni concentration of the outermost layer of the plated layer of the obtained sample was analyzed with AES (PHI-610 scanning Auger electron spectrometer manufactured by PerkinElmer Inc.) according to the above-described method, and the concentration of each element in a case where the sum of the concentrations of Ni, Co, and Fe was regarded as 100 atom % was calculated in atom %. At this time, a contaminated layer (for example, an oxide layer or the like) which was possibly formed on the surface layer of the plated layer was removed by sputtering the surface of the obtained sample with Ar ions as much as 10 nm in terms of SiO$_2$, and then the composition in a region having a diameter of 800 μm was analyzed. The obtained results are shown together in Table 3.

[Measurement of Profile of Fe Concentration of Cross Section of Plated Layer]

In addition, the profile of the Fe concentration of the plated layer in the depth direction in the cross section of the plated layer was also analyzed with AES according to above-described method. At this time, a sample having a width of 10 mm in a C direction (a direction orthogonal to the rolling direction) was cut out from the central part of each of the surface-treated steel sheets manufactured as described above. The obtained sample was embedded in a resin such that a cross section parallel to the C direction and perpendicular to an L direction (rolling direction) became observable, polished, etched with Nital, and linearly analyzed in the depth direction of the plated layer with the AES. In this case, in order to eliminate the influence of the polishing on the worked layer, the measurement was carried out after the surface of the worked layer was sputtered as much as 50 nm in terms of SiO$_2$ with Ar ions. The obtained results are shown together in Table 3. In the above-described AES measurement, the primary electron was set to 5 kV-100 nA, the analysis region was set to approximately 20 μm×30 μm, the sputtering was set to Ar$^+$ 2 kV-25 mA, and the sputtering rate was set to approximately 15 nm/min (in terms of SiO$_2$).

[Ni Coating Weight and Co Coating Weight of Plated Layer]

The Ni coating weight and the Co coating weight of the plated layer were quantified by dissolving the plated steel sheet in a mixed acid of concentrated hydrochloric acid and concentrated nitric acid (volume fraction of 1:1) and analyzing the solution by inductively coupled plasma (ICP) emission spectroscopy. In this case, Ni and Co in the steel sheet after the dissolution of the plated layer were measured using a fluorescent X-ray analyzer (scanning fluorescent X-ray analyzer ZSX PrimusII manufactured by Rigaku Corporation), and the end point was confirmed from the fact that there was no change in strength even after the plated layer was additionally dissolved.

TABLE 3

| | | | Plating conditions | | | | | | | | | | | | |
|---|---|---|---|---|---|---|---|---|---|---|---|---|---|---|---|
| | | | Coating weight (g/m²) | | | | Converting to plate thickness (μm) | | | Alloying condition | | Grain size | Surface concentration (at %) | | | Thickness of diffusion region |
| No. | Base steel sheet | Ni plating bath | Ni | Co | Ni + Co | Co/Ni | Ni | Co | Ni + Co | Soaking temperature | Soaking time | number | Ni | Co | Fe | (μm) | Remarks |
| 1 | 2 | High Cl bath 4 | 8.56 | 0.44 | 9 | 0.05 | 0.96 | 0.05 | 1.01 | 800° C. | 45 sec | 10.7 | 55 | 15 | 30 | 2.8 | Comparative example |
| 2 | 2 | High Cl bath 4 | 8.33 | 0.67 | 9 | 0.08 | 0.93 | 0.08 | 1.01 | 800° C. | 45 sec | 10.7 | 55 | 15 | 30 | 2.8 | Example |
| 3 | 2 | High Cl bath 4 | 8.11 | 0.89 | 9 | 0.11 | 0.91 | 0.10 | 1.01 | 800° C. | 45 sec | 10.7 | 50 | 25 | 25 | 2.7 | Example |
| 4 | 2 | High Cl bath 4 | 7.22 | 1.78 | 9 | 0.25 | 0.81 | 0.20 | 1.01 | 800° C. | 45 sec | 10.7 | 50 | 30 | 20 | 2.7 | Example |
| 5 | 2 | High Cl bath 4 | 6.33 | 2.67 | 9 | 0.42 | 0.71 | 0.30 | 1.01 | 800° C. | 45 sec | 10.7 | 40 | 45 | 15 | 2.6 | Reference example |
| 6 | 2 | High Cl bath 4 | 5.44 | 3.56 | 9 | 0.65 | 0.61 | 0.40 | 1.01 | 800° C. | 45 sec | 10.7 | 40 | 50 | 10 | 2.6 | Reference example |
| 7 | 2 | High Cl bath 4 | 4.56 | 4.45 | 9 | 0.98 | 0.51 | 0.50 | 1.01 | 800° C. | 45 sec | 10.7 | 40 | 55 | 5 | 2.5 | Reference example |
| 8 | 2 | High Cl bath 4 | 10.22 | 1.78 | 12 | 0.17 | 1.15 | 0.20 | 1.35 | 800° C. | 45 sec | 10.7 | 55 | 25 | 20 | 3.1 | Example |
| 9 | 2 | High Cl bath 4 | 13.22 | 1.78 | 15 | 0.13 | 1.48 | 0.20 | 1.68 | 800° C. | 45 sec | 10.7 | 60 | 25 | 15 | 3.5 | Example |
| 10 | 2 | High Cl bath 4 | 17.22 | 1.78 | 19 | 0.10 | 1.93 | 0.20 | 2.13 | 800° C. | 45 sec | 10.7 | 65 | 25 | 10 | 3.9 | Example |
| 11 | 2 | High Cl bath 4 | 10.11 | 0.89 | 11 | 0.09 | 1.13 | 0.10 | 1.23 | 800° C. | 45 sec | 10.7 | 50 | 30 | 20 | 3.0 | Example |
| 12 | 2 | High Cl bath 4 | 13.11 | 0.89 | 14 | 0.07 | 1.47 | 0.10 | 1.57 | 800° C. | 45 sec | 10.7 | 55 | 30 | 15 | 3.4 | Example |
| 13 | 2 | High Cl bath 4 | 17.11 | 0.89 | 18 | 0.05 | 1.92 | 0.10 | 2.02 | 800° C. | 45 sec | 10.7 | 60 | 30 | 10 | 3.8 | Example |
| 14 | 2 | High Cl bath 4 | 18.50 | 0.67 | 18 | 0.04 | 2.08 | 0.08 | 2.15 | 721° C. | 121 sec | 13.0 | 65 | 25 | 10 | 3.8 | Example |
| 15 | 3 | High Cl bath 4 | 20.44 | 3.56 | 24 | 0.17 | 2.29 | 0.40 | 2.69 | 820° C. | 45 sec | 10.2 | 60 | 25 | 15 | 6.2 | Example |
| 16 | 1 | High Cl bath 4 | 13.22 | 1.78 | 15 | 0.13 | 1.48 | 0.20 | 1.68 | 790° C. | 60 sec | 10.3 | 50 | 30 | 20 | 4.1 | Example |
| 17 | 3 | High Cl bath 4 | 13.22 | 1.78 | 15 | 0.13 | 1.48 | 0.20 | 1.68 | 790° C. | 40 sec | 12.0 | 50 | 40 | 10 | 3.3 | Example |
| 18 | 4 | High Cl bath 4 | 13.22 | 1.78 | 15 | 0.13 | 1.48 | 0.20 | 1.68 | 790° C. | 40 sec | 12.0 | 50 | 40 | 10 | 3.3 | Example |
| 19 | 5 | High Cl bath 4 | 13.22 | 1.78 | 15 | 0.13 | 1.48 | 0.20 | 1.68 | 780° C. | 45 sec | 10.3 | 50 | 40 | 10 | 3.4 | Example |
| 20 | 6 | High Cl bath 4 | 13.22 | 1.78 | 15 | 0.13 | 1.48 | 0.20 | 1.68 | 780° C. | 45 sec | 9.1 | 60 | 25 | 15 | 3.4 | Example |
| 21 | 7 | High Cl bath 4 | 13.22 | 1.78 | 15 | 0.13 | 1.48 | 0.20 | 1.68 | 790° C. | 60 sec | 8.0 | 60 | 25 | 15 | 4.1 | Comparative example |
| 22 | 2 | High Cl bath 1 | 13.22 | 1.78 | 15 | 0.13 | 1.48 | 0.20 | 1.68 | 800° C. | 45 sec | 10.7 | 60 | 30 | 10 | 3.2 | Example |
| 23 | 2 | High Cl bath 2 | 13.22 | 1.78 | 15 | 0.13 | 1.48 | 0.20 | 1.68 | 800° C. | 45 sec | 10.7 | 60 | 25 | 15 | 3.5 | Example |
| 24 | 2 | High Cl bath 3 | 13.22 | 1.78 | 15 | 0.13 | 1.48 | 0.20 | 1.68 | 800° C. | 45 sec | 10.7 | 60 | 25 | 15 | 3.5 | Example |
| 25 | 2 | Sulfuric acid bath | 13.22 | 1.78 | 15 | 0.13 | 1.48 | 0.20 | 1.68 | 800° C. | 45 sec | 10.7 | 50 | 50 | 0 | 1.0 | Comparative example |
| 26 | 2 | Watts bath | 13.22 | 1.78 | 15 | 0.13 | 1.48 | 0.20 | 1.68 | 800° C. | 45 sec | 10.7 | 50 | 50 | 0 | 1.0 | Comparative example |
| 27 | 2 | Ni-Co bath | 4.56 | 4.45 | 9 | 0.98 | 0.51 | 0.50 | 1.01 | 800° C. | 45 sec | 10.7 | 55 | 45 | 0 | 0.2 | Comparative example |
| 28 | 2 | Ni-Co bath | 9.11 | 8.89 | 18 | 0.98 | 1.02 | 1.00 | 2.02 | 800° C. | 45 sec | 10.7 | 55 | 45 | 0 | 0.2 | Comparative example |
| 29 | 2 | Watts bath | 13.22 | 1.78 | 15 | 0.13 | 1.48 | 0.20 | 1.68 | 800° C. | 45 sec | 10.7 | 55 | 45 | 0 | 1.0 | Comparative example |
| 30 | 8 | Watts bath | 7.22 | 1.78 | 9 | 0.25 | 0.81 | 0.20 | 1.01 | 900° C. | 60 sec | 3.0 | 55 | 25 | 20 | 3.7 | Comparative example |
| B | 2 | Watts bath | 20.00 | 0.00 | 20 | 0.00 | 2.24 | 0.00 | 2.24 | 800° C. | 45 sec | 10.7 | 100 | 0 | 0 | — | Basis |

<Measurement of Charge Transfer Resistance of Surface>

The conductive properties of the surface-treated steel sheets manufactured as described above were evaluated by focusing on the charge transfer resistance of the surface. At this time, the manufactured surface-treated steel sheets were held at a constant potential of manganese dioxide in the positive electrode (0.3 V vs. Hg/HgO) for 10 days in a 35% KOH aqueous solution at 60° C., and then the impedance values at a frequency of 0.1 Hz were evaluated by an electrochemical impedance method. At this time, when the impedance value was lower than 50Ω, the charge transfer resistance was evaluated as "A grade" (pass), and, when the impedance value was 50Ω or higher, the charge transfer resistance was evaluated as "B grade" (fail). The obtained results are shown in Table 4 below.

<Evaluation of Electrolytic Solution Resistance>

For the surface-treated steel sheets manufactured as described above, the electrolytic solution resistance was evaluated. Each of the obtained surface-treated steel sheets was pressed into a cylindrical can, and the side surface portion of the can was cut out. The end surface of the cut-out sample was sealed to set the exposed area to 1 cm$^2$ and was held at a constant potential of manganese dioxide in the positive electrode (0.3 V vs. Hg/HgO) for 20 days in 100 ml of a 7 M-KOH aqueous solution at 40° C., and the amounts of Ni, Co, and Fe in the aqueous solution were evaluated by inductively coupled plasma (ICP) emission spectroscopy. At this time, in a case where the total of the amounts of Ni, Co, and Fe eluted was less than 1.5 times the total of the amounts of Ni, Co, and Fe eluted in a surface-treated steel sheet that served as a valuation basis (the surface-treated steel sheet indicated as "Basis" or "B" in Table 3), the electrolytic solution resistance was evaluated as "A grade" (pass), and, in a case where the former total was 1.5 times or more the latter total, the electrolytic solution resistance was evaluated as "B grade" (fail). The obtained results are shown in Table 4 below.

<Evaluation of Adhesion>

A 20 mm×50 mm sample was obtained by punching from the central part of each of the surface-treated steel sheets manufactured as described above and used as a measurement sample. The obtained sample was subjected to OT bending and then bent back. Subsequently, a tensile test was carried out such that the elongation percentage reached 2%. Pressure-sensitive adhesive tape was attached to both surfaces of the sample that had been subjected to the tensile test, and a tape peeling test was carried out. In a case where the plated layer did not peel off, the adhesion was evaluated as "A grade" (pass), and, in a case where the plated layer peeled off, the adhesion was evaluated as "B grade" (fail). The obtained results are shown in Table 4 below.

<Evaluation of Scratch Resistance>

For the surface-treated steel sheets manufactured as described above, the scratch resistance was evaluated. A MnO$_2$ paste was applied to the surface of each of the obtained surface-treated steel sheets such that the coating weight in a dry state reached 5 g/m$^2$ and dried. After drying, an iron ball was placed on the MnO$_2$ layer, and the iron ball was reciprocally slid 10 times while applying a load of 1 kg. The deepest part of a generated scratch was analyzed with AES (the above-described PHI-610 scanning Auger electron spectrometer manufactured by PerkinElmer Inc.). In a case where the Ni concentration and the Co concentration were each 5 atom % or more, the scratch resistance was evaluated as "A grade" (pass), and, in a case where at least any of the Ni concentration and the Co concentration was less than 5 atom %, the scratch resistance was evaluated as "B grade" (fail). The obtained results are shown in Table 4 below.

TABLE 4

| | Evaluation results | | | | |
|---|---|---|---|---|---|
| No. | conductive property | electrolytic solution resistance | adhesion | scratch resistance | Remarks |
| 1 | B | A | A | A | Comparative example |
| 2 | A | A | A | A | Example |
| 3 | A | A | A | A | Example |
| 4 | A | A | A | A | Example |
| 5 | A | A | A | A | Reference example |
| 6 | A | A | A | A | Reference example |
| 7 | A | A | A | A | Reference example |
| 8 | A | A | A | A | Example |
| 9 | A | A | A | A | Example |
| 10 | A | A | A | A | Example |
| 11 | A | A | A | A | Example |
| 12 | A | A | A | A | Example |
| 13 | A | A | A | A | Example |
| 14 | A | A | A | A | Example |
| 15 | A | A | A | A | Example |
| 16 | A | A | A | A | Example |
| 17 | A | A | A | A | Example |
| 18 | A | A | A | A | Example |
| 19 | A | A | A | A | Example |
| 20 | A | A | A | A | Example |
| 21 | A | B | A | A | Comparative example |
| 22 | A | A | A | A | Example |
| 23 | A | A | A | A | Example |
| 24 | A | A | A | A | Example |
| 25 | A | A | A | B | Comparative example |
| 26 | A | A | A | B | Comparative example |
| 27 | A | A | B | B | Comparative example |
| 28 | A | A | B | A | Comparative example |
| 29 | A | A | B | B | Comparative example |
| 30 | A | B | A | A | Comparative example |
| B | — | Basis | — | — | Basis |

As is clear from Table 4, the surface-treated steel sheets corresponding to the examples of the present invention showed excellent evaluation results in all of the conductive property, the electrolytic solution resistance, the adhesion, and the scratch resistance. On the other hand, it was clarified that the surface-treated steel sheets corresponding to the comparative examples of the present invention were poor in at least any of the conductive property, the electrolytic solution resistance, the adhesion, and the scratch resistance. The table also shows, as a reference example, the data of an example having a small Ni coating weight and a large Co coating weight. In these examples, since the lack of the Ni coating weight was compensated for by a large amount of Co, favorable evaluation results were obtained. However, the required coating weight of Co increased, which is against the aim of the present invention of reducing the amount of Co used, and thus these examples are shown in the table as the reference example that is outside the scope of the present invention.

Hitherto, the preferred embodiment of the present invention has been described in detail with reference to the accompanying drawings, but the present invention is not limited to such examples. It is evident that a person skilled in the art of the present invention is able to consider a variety of modification examples or correction examples within the scope of the technical concept described in the claims, and it is needless to say that such examples are understood to be in the technical scope of the present invention.

BRIEF DESCRIPTION OF THE REFERENCE SYMBOLS

1 Surface-treated steel sheet
11 Base steel sheet
13 Ni—Co—Fe alloy-plated layer

The invention claimed is:

1. A surface-treated steel sheet, comprising:
a base steel sheet; and
a Ni—Co—Fe alloy-plated layer positioned on at least one surface of the base steel sheet,
wherein, in the Ni—Co—Fe alloy-plated layer, a Ni coating weight is in a range of 7.1 to 32.5 g/m$^2$, a Co coating weight is in a range of 0.65 to 5.2 g/m$^2$, and furthermore, a total of the Ni coating weight and the Co coating weight is in a range of 9.0 to 35.0 g/m$^2$,
in an outermost layer of the Ni—Co—Fe alloy-plated layer, a Co concentration is in a range of 20 to 60 atom %, and a Fe concentration is in a range of 5 to 30 atom %,
in the Ni—Co—Fe alloy-plated layer, a region having a thickness of 2 μm or more, where a total of a Ni concentration and the Co concentration is 10 atom % or more and the Fe concentration is 5 atom % or more, is present,
a chemical composition of the base steel sheet includes, by mass %,
C: 0.001% to 0.020%,
Si: 0.1% or less,
Mn: 0.05% to 0.90%,
P: 0.025% or less,
S: 0.025% or less,
sol. Al: 0.003% to 0.100%,
N: 0.007% or less, and
B: 0% to 0.0050%,
the chemical composition further includes
at least any one of 0.1% or less of Ti and 0.12% or less of Nb such that a relationship represented by Expression (1) is satisfied, a remainder consists of Fe and an impurity, and
a ferrite grain size number of the base steel sheet, specified by JIS G 0551 (2013), is 9.0 or more, $$(C/12+N/14)<(Ti/48+Nb/93)+0.001 \quad \text{Expression (1)}$$

in Expression (1), C, N, Ti, and Nb represent contents (unit: mass %) of each of the elements.

2. The surface-treated steel sheet according to claim 1, wherein, in the outermost layer of the Ni—Co—Fe alloy-plated layer, a total of the Fe concentration and the Co concentration is 65 atom % or less, and the Co concentration is higher than the Fe concentration.

3. The surface-treated steel sheet according to claim 2, wherein, in the Ni—Co—Fe alloy-plated layer, a ratio of the Co coating weight to the Ni coating weight is in a range of 0.05 to 0.27.

4. The surface-treated steel sheet according to claim 1, wherein the ferrite grain size number of the base steel sheet is 10 or more.

5. The surface-treated steel sheet according to claim 4, wherein, in the Ni—Co—Fe alloy-plated layer, a ratio of the Co coating weight to the Ni coating weight is in a range of 0.05 to 0.27.

6. The surface-treated steel sheet according to claim 1, wherein, in the Ni—Co—Fe alloy-plated layer, a ratio of the Co coating weight to the Ni coating weight is in a range of 0.05 to 0.27.

7. The surface-treated steel sheet according to claim 1, wherein the surface-treated steel sheet is used for a battery can.

8. The surface-treated steel sheet according to claim 1, wherein the surface-treated steel sheet is used for a positive electrode current collector of a battery having an alkaline aqueous solution used as an electrolytic solution.

9. The surface-treated steel sheet according to claim 1, wherein the Co coating weight is in a range of 0.9 to 5.2 g/m$^2$.

10. A method for manufacturing a surface-treated steel sheet, the method comprising:
carrying out Ni plating on a steel sheet having the chemical composition of the base steel sheet according to claim 1 using a Ni plating bath having a chloride ion concentration of 35 g/L or more;
carrying out Co plating on the steel sheet; and
carrying out an alloying treatment on the steel sheet.

11. A surface-treated steel sheet, comprising:
a base steel sheet; and
a Ni—Co—Fe alloy-plated layer positioned on at least one surface of the base steel sheet,
wherein, in the Ni—Co—Fe alloy-plated layer, a Ni coating weight is in a range of 7.1 to 32.5 g/m$^2$, a Co coating weight is in a range of 0.65 to 5.2 g/m$^2$, and furthermore, a total of the Ni coating weight and the Co coating weight is in a range of 9.0 to 35.0 g/m$^2$,
in an outermost layer of the Ni—Co—Fe alloy-plated layer, a Co concentration is in a range of 20 to 60 atom %, and a Fe concentration is in a range of 5 to 30 atom %,
in the Ni—Co—Fe alloy-plated layer, a region having a thickness of 2 μm or more, where a total of a Ni concentration and the Co concentration is 10 atom % or more and the Fe concentration is 5 atom % or more, is present,
a chemical composition of the base steel sheet includes, by mass %,
C: 0.001% to 0.020%,
Si: 0.1% or less,
Mn: 0.05% to 0.90%,
P: 0.025% or less,
S: 0.025% or less,
sol. Al: 0.003% to 0.100%,
N: 0.007% or less, and
B: 0% to 0.0050%,
the chemical composition further includes
at least any one of 0.1% or less of Ti and 0.12% or less of Nb such that a relationship represented by Expression (1) is satisfied, a remainder comprising Fe and an impurity, and
a ferrite grain size number of the base steel sheet, specified by JIS G 0551 (2013), is 9.0 or more, $$(C/12+N/14)<(Ti/48+Nb/93)+0.001 \quad \text{Expression (1)}$$

in Expression (1), C, N, Ti, and Nb represent contents (unit: mass %) of each of the elements.

* * * * *